(12) United States Patent
Hu et al.

(10) Patent No.: US 7,818,845 B2
(45) Date of Patent: Oct. 26, 2010

(54) AUTOMATICALLY AND MANUALLY ACTIVATED OPEN-AND-CLOSE HINGE DEVICE

(75) Inventors: Bo Hu, ShenZhen (CN); Yusho Nakase, Yokohama (JP); Shi-Jie Tan, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 390 days.

(21) Appl. No.: 11/977,057

(22) Filed: Oct. 23, 2007

(65) Prior Publication Data

US 2008/0092335 A1    Apr. 24, 2008

(30) Foreign Application Priority Data

Oct. 23, 2006    (CN) .................... 2006 2 0127065 U

(51) Int. Cl.
*E05D 11/10* (2006.01)

(52) U.S. Cl. .............................. 16/330; 16/303; 16/327; 16/353

(58) Field of Classification Search ................... 16/330, 16/327, 328, 329, 331, 332, 334, 324, 325, 16/326, 349, 352, 353, 376, 377, 303; 455/575.3; 379/433.11, 433.12, 433.13; 361/679.06, 361/679.07, 679.11, 679.12, 679.15, 679.16, 361/679.2, 679.27, 679.28
See application file for complete search history.

(56) References Cited

U.S. PATENT DOCUMENTS 5,923,751 A * 7/1999 Ohtsuka et al. ........ 379/433.13

| 6,886,221 | B2 * | 5/2005 | Minami et al. ................ 16/324 |
| 7,627,930 | B2 * | 12/2009 | Duan et al. .................... 16/330 |
| 2006/0174443 | A1 * | 8/2006 | Takagi et al. .................. 16/330 |
| 2006/0242795 | A1 * | 11/2006 | Duan et al. .................... 16/330 |
| 2006/0242796 | A1 * | 11/2006 | Duan et al. .................... 16/330 |
| 2008/0034541 | A1 * | 2/2008 | Duan et al. .................... 16/330 |

* cited by examiner

*Primary Examiner*—Victor Batson
*Assistant Examiner*—Jeffrey O'Brien
(74) *Attorney, Agent, or Firm*—Ming Chieh Chang; Wei Te Chung; Andrew C. Cheng

(57) ABSTRACT

An open-and-close hinge device comprise a shaft member having a first end and a second end; a fixture securely attached to the first end of the shaft member, and including an actuating member with a push-bottom moveably toward the second of the shaft member when triggered; an initiating cam rotationally assembled to the shaft member and next to the fixture, a locking key arranged between the initiating cam and fixture preventing the initiating cam from rotating against the fixture, the initiating cam having a first cam surface toward the second end; a follower rotationally and slidably attached to the shaft, and having a second cam surface biasing against toward the first cam surface of the initiating cam, and a third cam surface toward the second end of the shaft member; a slider cam slidably assembled to the shaft member and having a forth cam surface biasing against toward the third cam surface of the follower; a first compression spring interposed resiliently between the slider cam and the second end of shaft; a second compression spring interposed resiliently between the initiating cam and the locking key.

20 Claims, 5 Drawing Sheets

AUTOMATICALLY AND MANUALLY ACTIVATED OPEN-AND-CLOSE HINGE DEVICE

BACKGROUND OF THE INVENTION

1. Field of the Invention

The present invention generally relates to an open-and-close hinge device suitable for use especially with a portable telephone. In automatic mode, simply push a button and a cam device will be rotated by a spring such that a cover attached to the base is automatically opened. However, if a user wants to open the cover manually, simply open the cover, and the corresponding cam will rotate through adjacent cam surface.

2. Description of the Prior Art

Conventionally, a portable telephone where a transmitter section and a receiver section, or a keyboard side and a display side, thereof are mounted separately on a fixed side body and a movable side body respectively to be folded in two and opened and closed relative to each other, is known, and for this purpose, such an open-and-close hinge device is known as shown, for example, in Japanese Patent Laid-open No. 8-125725, wherein a torsion spring wound spirally around a shaft is interposed resiliently between a mounting portion of the fixed side body and a mounting portion of the movable side body connected with each other via the shaft so as to be folded in two freely, and an arresting means for engaging one end portion of the torsion spring with the mounting portion of the movable side body only within a predetermined opening angle of the receiver section, is provided between the mounting portion of the fixed side body and the mounting portion of the movable side body while a cam mechanism is provided between the mounting portion of the fixed side body and the mounting portion of the movable side body, whereby the cam mechanism is operated by pushing a push-button disposed in an axial direction of the mounting portion of the fixed side body to rotate the receiver section to the position in which the arresting means arrests one end portion of the torsion spring, and wherein a locking means is provided for releasing the engagement of the movable side body with the mounting portion of the fixed side body by pushing the push-button against the mounting portion of the movable side body while a friction mechanism is provided for stopping the movable side body in a free stopping way when and after it reaches a predetermined opening angle, so that the movable side body is opened automatically to a predetermined angle relative to the fixed side body by pushing the push-button in a push style.

As the above-described conventionally known open-and-close hinge device of a push type requires many parts and the structure thereof is complicated, there have been disadvantages that it often has trouble and is expensive.

SUMMARY OF THE INVENTION

An object of the present invention is to provide an open-and-close hinge device suitable for use especially with a portable telephone which is so constructed to reduce cost by minimizing the number of parts to simplify the structure thereof.

In order to achieve the above-mentioned object, the present invention comprise a shaft member having a first end and a second end; a fixture securely attached to the first end of the shaft member, and including an actuating member with a push-bottom moveably toward the second of the shaft member when triggered; an initiating cam rotationally assembled to the shaft member and next to the fixture, a locking key arranged between the initiating cam and fixture preventing the initiating cam from rotating against the fixture, the initiating cam having a first cam surface toward the second end; a follower rotationally and slidably attached to the shaft, and having a second cam surface biasing against toward the first cam surface of the initiating cam, and a third cam surface toward the second end of the shaft member; a slider cam slidably assembled to the shaft member and having a forth cam surface biasing against toward the third cam surface of the follower; a first compression spring interposed resiliently between the slider cam and the second end of shaft; a second compression spring interposed resiliently between the initiating cam and the locking key. The device further defines a position ring and a locking ring respectively disposed in the two ends of the shaft, and a housing joining to the follower.

DETAILED DESCRIPTION OF THE PREFERRED EMBODIMENT

Figure 1:
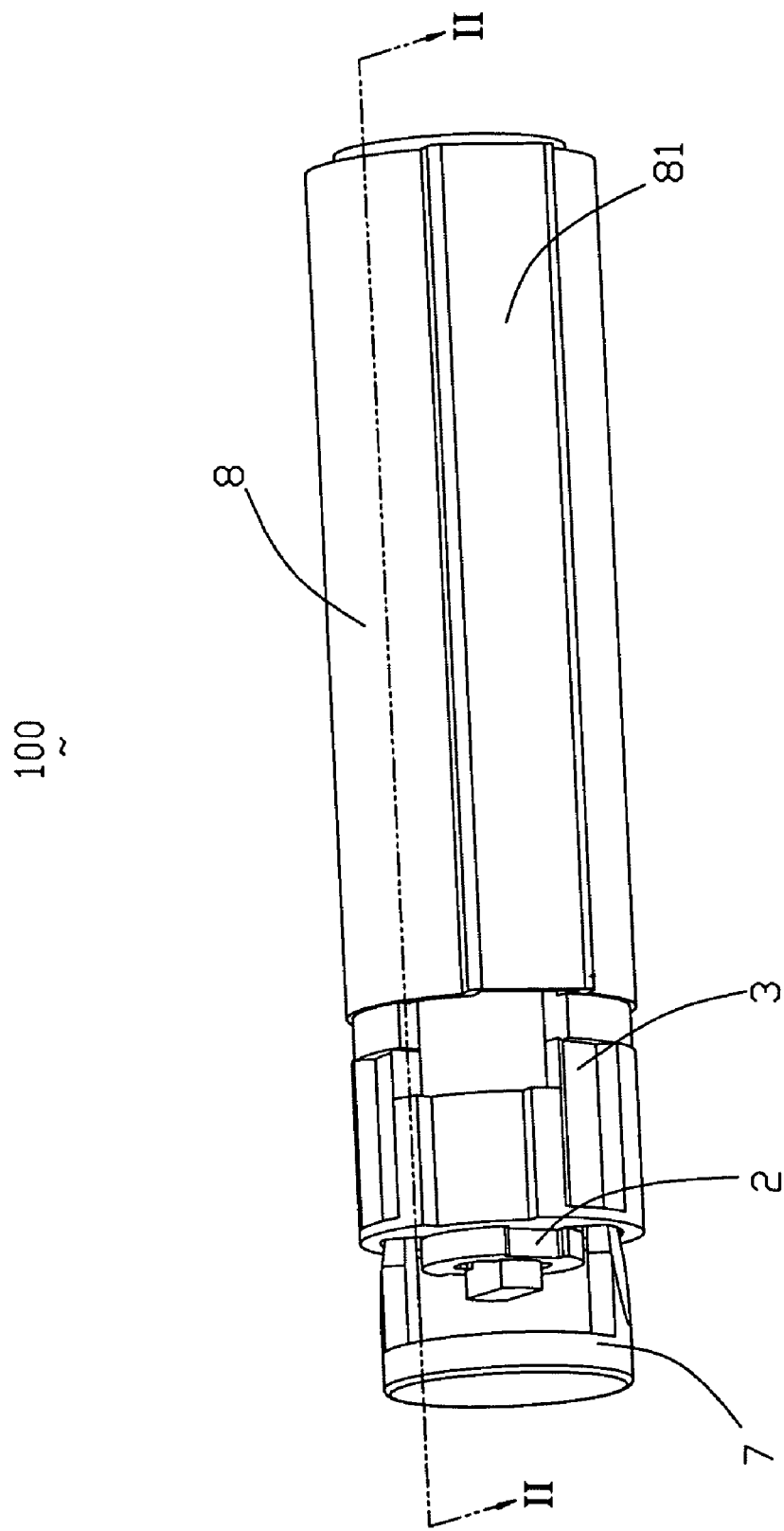
FIG. 1 is a perspective view of an open-and-close hinge device in accordance with an exemplary embodiment of the present invention.
Figure 2:
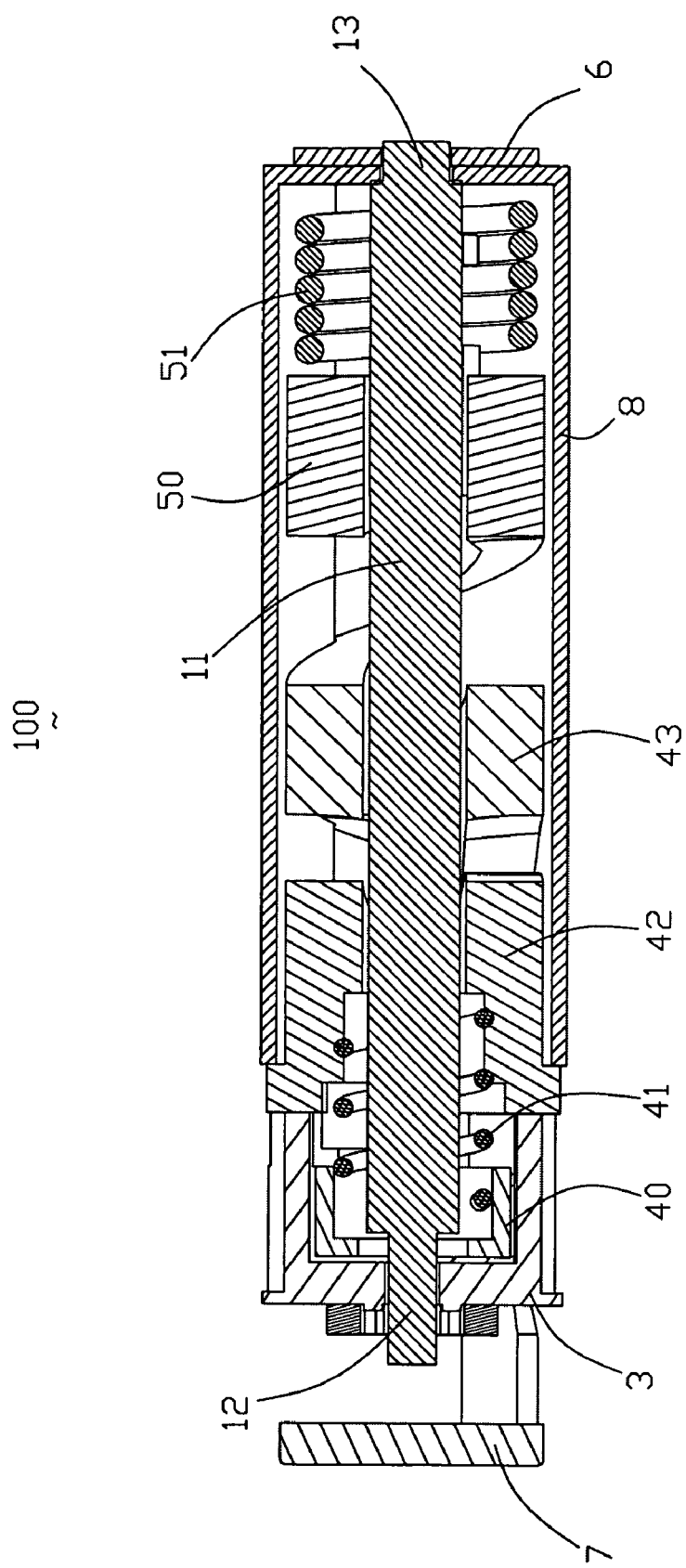
FIG. 2 is a sectional plane view of a part of the open-and-close hinge device according to the present invention.

Reference will now be made to describe the preferred embodiment of the present invention in detail.

The open-and-close hinge device 100 is used in portable telephone having a cover portion (no shown) and a based portion (no shown). The open-and-close hinge device 100 comprise a shaft 1 having a first end 12 and a second end 13; a fixture 3 securely attached to the first end 12 of the shaft 1, and including an actuating member with a push-bottom 7 moveably toward the second end 12 of the shaft 1 when triggered; an initiating cam 42 rotationally assembled to the shaft 1 and next to the fixture 3, a locking key 40 arranged between the initiating cam 42 and the fixture 3 preventing the initiating cam 42 from rotating against the fixture 3, the initiating cam 42 having a first cam surface 421 toward the second end 13; a follower 43 rotationally and slidably attached to the shaft 1, and having a second cam surface 433 biasing against toward the first cam surface 421 of the initiating cam 42, and a third cam surface 431 toward the second end 13 of the shaft 1; a slider cam 50 slidably assembled to the shaft 1 and having a fourth cam surface 53 biasing against toward the third cam surface 431 of the follower 43; a first compression spring 51 interposed resiliently between the slider cam 50 and the second end 13 of shaft 1; a second compression spring 41 interposed resiliently between the initiating cam 42 and the locking key 40. The device further defines a position ring 6 and a locking ring 2 respectively disposed in the two ends of the shaft 1, and a housing 8 joining to the follower 43.

Figure 3:
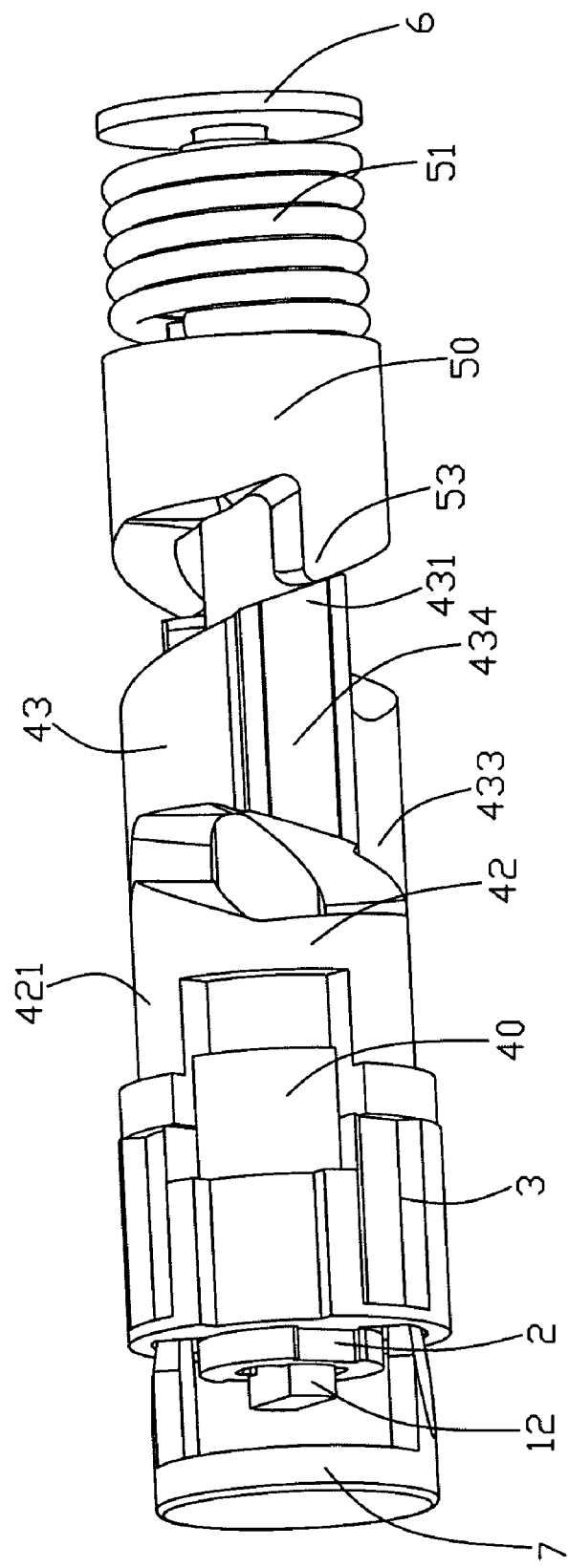
FIG. 3 is a perspective view of an essential part of the open-and-close hinge device in accordance with an exemplary embodiment of the present invention.

The composition of the open-and-close hinge device 100 is shown in FIG. 1 to FIG. 5. A reference number 1 denotes a shaft 1 having a second end 13 with a small-diameter, an engage portion 11 adjacent to the second end 13, and on a free end of the engage portion 11 there are disposed a first end 12 with a circumferential groove 121 for arresting the locking ring 2. The engage portion 11 defines at least one slider key 111. As shown in FIG. 3, a position ring 6 is fixed on the second end 13 and a slider cam 50 is attached slidably in an axial direction with the slider key 111 of the shaft 1 engageably passing through an engaging hole 54 having a matching structure corresponded to the slider key 111.

Figure 4:
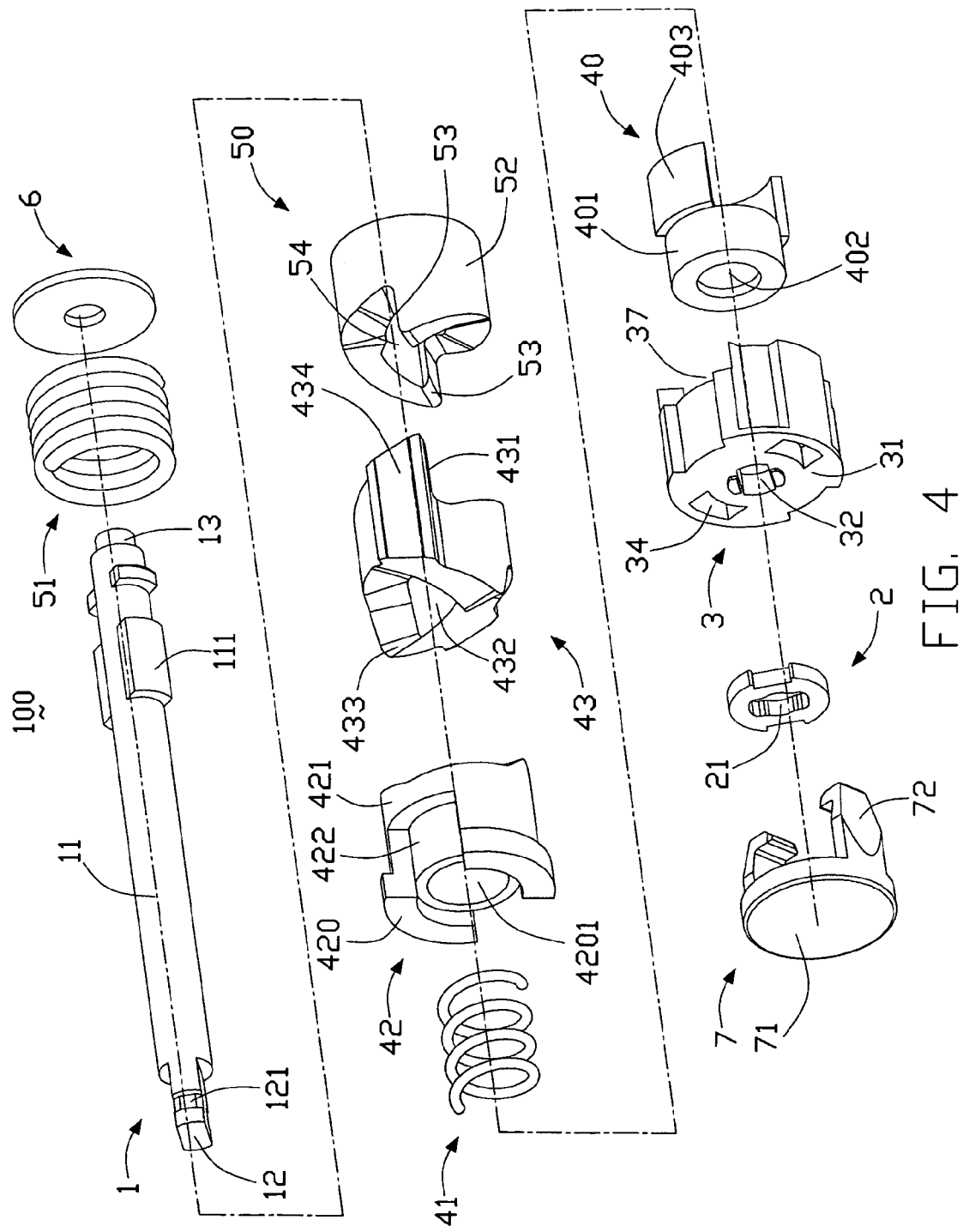
FIG. 4 is an exploded perspective view of the open-and-close hinge device in accordance with FIG. 3.
Figure 5:
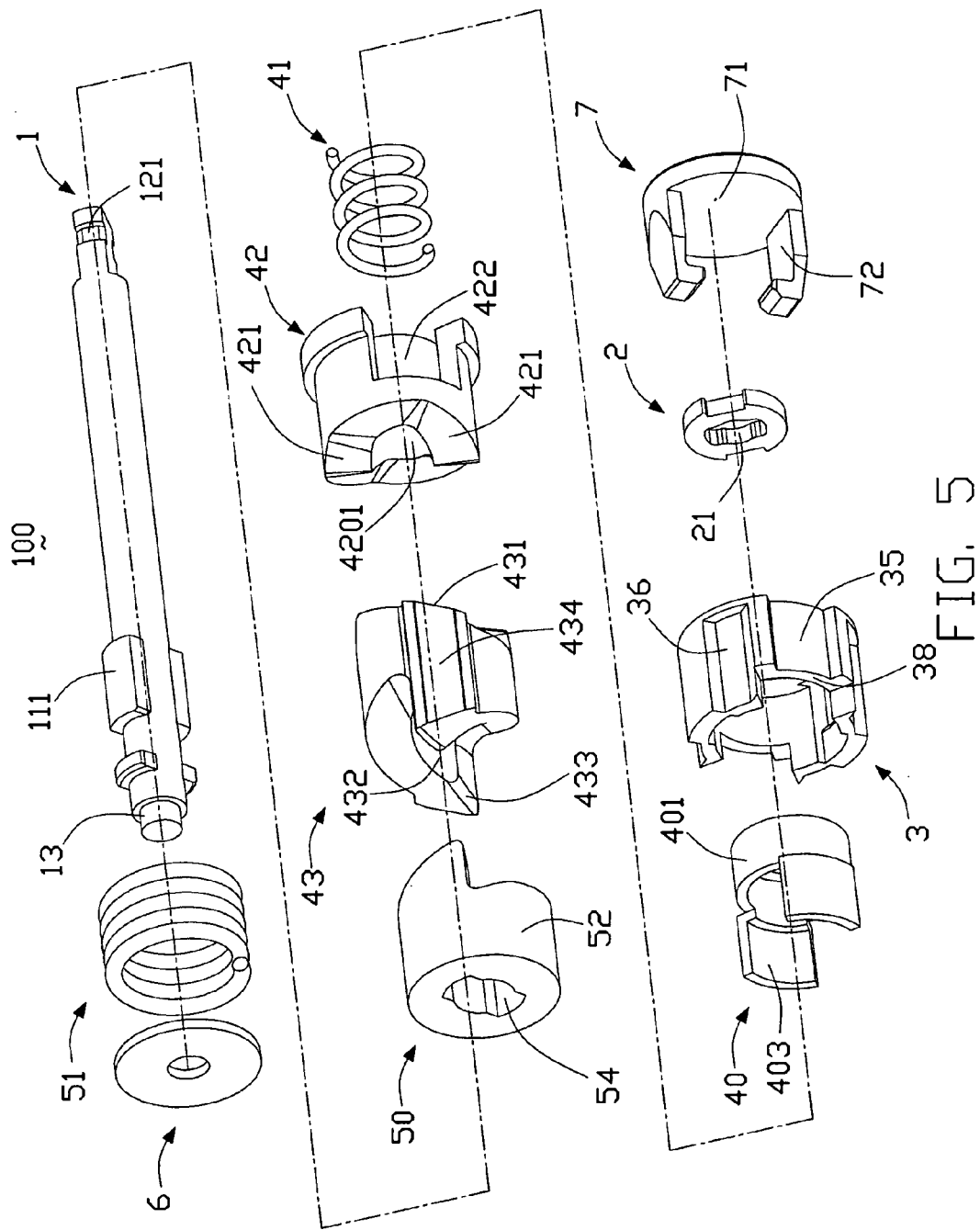
FIG. 5 is another view of the open-and-close hinge device in accordance with FIG. 4.

The slider cam 50, which has, as especially shown in FIG. 4 and FIG. 5, a body portion 52 and a pair of fourth convex inclined cam surfaces 53 projecting in an axial direction of an end face of the body portion 52, is based slidably in the left direction in FIG. 3 by interposing resiliently a first compression spring 51 spirally wound around the engaging portion 11 between the position ring 6 and the body portion 52 thereof.

As especially in FIG. 4 and FIG. 5, The follower 43, which has a pair of third concave inclined cam surface 431 engagably facing a pair of the fourth convex inclined cam surface 53 and a pair of second convex inclined cam surface 433, is attached with the engaging portion 11 of the shaft 1 passing rotatably through a through hole 432 provided in a center portion thereof in an axial direction. The follower 43 further defines arresting projections 434 disposed in an outer circumference thereof in an axial direction and engaged with the engaging grooves 81 disposed inside of the housing 8.

The initiating cam 42 has a flange portion 420 with a long diameter in one end portion thereof, a pair of first concave inclined cam surface 421 disposed in another end portion thereof and a pair of locking groove 422 provided in an outer circumference of flange portion 420. The initiating cam 42 is attached with the engage portion 11 of the shaft 1 passing rotatably through rotatable hole 4201 provided in a center thereof in an axial direction.

The locking key 40 defines a based portion 401, a through hole 402 provided in a center portion of the based portion 401 in an axial direction, and a pair of arresting leg portion 403 adjacent to the based portion 401 for arresting the rotation of the follower 43 by engaging with the locking groove 422 of initiating cam 42 and engaging portion 37 of fixture 3 described below or allowing the rotation of the follower 43 by being released from them.

The second compression spring 41 is spirally wound around the locking key 40 with a weaker resilient force than that of another first compression spring 51 and interposed resiliently between the locking key 40 and the initiating cam 42.

The fixture 3 has a bottom plate 31, a first deformed hole 32 provided in a center portion of the bottom plate 31, a sidewall (no shown) extending from the bottom plate 31, a engaging portion 37 extending from the free end of sidewall to bottom plate 31 and not touching the bottom plate 31 for arresting the arresting leg portion 403 of locking key 40, and a receiving space 38 for accommodating the based portion 401 of the locking key 40. The fixture 3 further defines arresting grooves 36 disposed in an outer circumference of the sidewall in an axial direction and engaged with the engaging projections (no shown) disposed inside the base of portable telephone.

The locking ring 2 having a deformed through hole 21 provided in a center portion thereof and engaged with the circumferential groove 121 of first end 12 for preventing the fixture 3 coming off the shaft 1.

The push-bottom 7 has a plat portion 71 and a pair of arresting portion 72 inserted inside the fixture 3 through inserting holes 34 disposed in a bottom plate 31 of the fixture 3.

Therefore, in a state where the movable side cover is relative to the base of portable telephone, the cover and the base are kept in a closed state since the arresting leg portion 403 of locking key 40 engaged with the engaging portion 37 of the fixture 3 while engaging with the locking groove 422 of initiating cam 42 to arrest the rotation of the follower 43, and each of the fourth convex inclined cam surface 53 of the slider cam 50 are arrested in each of the third concave inclined cam surface 431 of the follower 43 as shown in FIG. 3.

Here, when the movable side cover is opened and closed manually relative to the base, each of the third concave inclined cam surface 431 of the follower 43 cross over each of the fourth convex inclined cam 53 of the slider cam 50 while each of the second convex inclined cam 433 crossing over each of the first concave inclined cam surface 421 of initiating cam 42 so that the opening and closing operations can be performed manually.

Next, when the push-bottom 7 is pushed in order to automatically open the movable cover relative to the fixed base, the push-bottom 7 is pushed in lightly against the weak resilient force of the second compression spring 41, and at the same time the arresting leg portion 403 of locking key 40 slide in the right direction from a state shown in FIG. 3 where they are in engagement with the locking groove 422 of initiating cam 42, thereby released from the engaging portion 37 of the fixture 3, so that the follower 43 is made rotatable due to the fourth convex inclined cam portion 53 of the slider cam 50 biased slidably in one direction by the first compression spring 51 are guided by the third concave inclined cam surface 431 of follower 43 to cause a rotataion torque to the follower 43, thereby driving the initiating cam 42 rotate with the follower 43 so that the movable cover is opened automatically. At this time, if the hand is off the push-bottom 7, the arresting leg portion 403 of locking key 40 accommodated into the locking groove 422 of initiating cam 42 to restrain the movement thereof in an axial direction, and as a result the push-bottom 7 is kept in its ON state.

The follower 43 and each of the cams are spaced at the interval of 180 degree, and shaft member comprise a position ring 6, a locking ring 2 and shaft 1. But in this embodiment, the opening angle of the movable side cover is controlled at 165 degree, so that the engaging portion 37 of the fixture 3 is bigger than the arresting leg portion 403 of locking key 40 to make sure the arresting leg portion 403 accommodated in the engaging portion 37 completely when the device is at an opening state.

When the movable side cover is closed manually from this state, the third concave inclined cam surface 431 of the follower 43 slip on the fourth convex inclined cam surface 53 of the slider cam 50 slip while the second convex inclined cam surface 433 of the follower 43 overlapping on the first concave inclined cam surface 421 of the initiating cam 42 to return to a closing state of the telephone.

While the present invention has been described with reference to a specific embodiment, the description of the invention is illustrative and is not to be construed as limiting the invention. Various modifications to the present invention can be made to the preferred embodiment by those skilled in the art without departing from the true spirit and scope of the invention as defined by the appended claims. For example, in this embodiment, the slider cam is not rotatable due to axial slider key 111. Anyhow, a curved or oblique substitute key may result in rotation plus sliding of the slider cam instead of the pure axial movement thereof.

What is claimed is:

1. An automatic and manually activated open-and-close hinge device comprising:

a shaft member having a first end and a second end;

a fixture securely attached to the first end of the shaft member, and including an actuating member with a push-button movable toward the second end of the shaft member when triggered;

an initiating cam rotationally assembled to the shaft member and next to the fixture, a locking key arranged between the initiating cam and fixture preventing the initiating cam from rotating against the fixture, the initiating cam having a first cam surface toward the second end;

a follower rotationally and slidably attached to the shaft, and having a second cam surface biasing against toward the first cam surface of the initiating cam, and a third cam surface toward the second end of the shaft member;

a slider cam slidably assembled to the shaft member and having a fourth cam surface biasing against toward the third cam surface of the follower;

a compression spring member attached to the shaft for providing the resilience to the device to axially move the slider cam.

2. An automatic and manually activated open-and-close hinge device according to the claim 1, wherein said device further defines a housing joining to the follower.

3. An automatic and manually activated open-and-close hinge device according to the claim 1, wherein the compression spring member comprises a first compression spring interposed resiliently between the slider cam and the second end of shaft and a second compression spring interposed resiliently between the initiating cam and the locking key.

4. An automatic and manually activated open-and-close hinge device according to the claim 1, wherein said fourth cam surface is a convex inclined cam surface, and said third cam surface of said follower is a third concave inclined cam surface in substantially the match shape related to the fourth cam surface.

5. An automatic and manually activated open-and-close hinge device according to the claim 4, wherein said second cam surface is a convex inclined cam surface, said first cam surface is a concave inclined cam surface in substantially the match shape related to the second cam surface.

6. An automatic and manually activated open-and-close hinge device according to the claim 4, wherein each cam surface of follower, slider cam and initiating cam are spaced at the interval of 180 degree, respectively.

7. An automatic and manually activated open-and-close hinge device according to the claim 1, wherein said locking key defines a based portion, a through hole provided in a center portion of the based portion in an axial direction, and a pair of arresting leg portion adjacent to the based portion.

8. An automatic and manually activated open-and-close hinge device according to the claim 7, wherein said fixture further has a bottom plate, a first deformed hole provided in a center portion of the bottom plate, a sidewall extending from the bottom plate, a engaging portion extending from the free end of sidewall to bottom plate for arresting the arresting leg portion of locking key, and a receiving space for accommodating the based portion of the locking key.

9. An automatic and manually activated open-and-close hinge device according to the claim 8, wherein said initiating cam further has a flange portion with a long diameter in one end portion thereof and a pair of locking groove provided in an outer circumference of flange portion.

10. An automatic and manually activated open-and-close hinge device comprising:

a shaft member having spaced first and second sections along an axial direction;

a fixture securely attached to the first section of the shaft member, and including an actuating member with a push-button movable toward the second section of the shaft member when triggered;

an initiating cam assembled around the first section of the shaft member, said initiating cam being either rotatable or stationary relative to the shaft selectively, a locking device selectively applied upon said initiating cam to selectively engage said initiating cam in a locked state with no rotation permitted or in a free state with freedom to rotate;

a follower assembled inside of said initiating cam along said axial direction, said follower being rotatable and slidable relative to the shaft, first complementary interengagement structures formed on said initiating cam and said follower and configured to either have said follower bring said initiating cam to rotate commonly when said initiating cam is in the free state, or have said follower rotate relative to the initiating cam when said initiating cam is in the locked state;

a slider cam assembled around the second sections section and cooperating with said initiating cam to sandwich said follower therebetween along said axial direction, said slider cam being slidable along said axial direction, second complementary interengagement structures formed on said slider cam and said follower and configured to have said follower rotated when a relative axial movement between said slider cam and said follower occurs;

a primary spring member being deformable along said axial direction and constantly urging said slider cam toward said follower in said axial direction.

11. The automatic and manually activated open-and-close hinge device as claimed in claim 10, further including a release device to unlock said initiating cam from the locked state.

12. The automatic and manually activated open-and-close hinge device as claimed in claim 10, further including a secondary spring member to constantly urge the locking device toward the locked state.

13. The automatic and manually activated open-and-close hinge device as claimed in claim 10, wherein said follower is slidably moved along said axial direction when there is a relative rotation between said follower and said initiating cam.

14. The automatic and manually activated open-and-close hinge device as claimed in claim 10, wherein an exerted force from said primary spring member is able to make the follower rotate along with the initiating cam when said initiating cam is in a free state, while unable to rotate said follower relative to the initiating cam when said initiating cam is in a locked position.

15. The automatic and manually activated open-and-close hinge device as claimed in claim 10, wherein said slider cam is rotatable relative to the shaft member during operation.

16. The automatic and manually activated open-and-close hinge device as claimed in claim 12, wherein said secondary spring member is spaced from said primary spring with a distance in said axial direction.

17. An automatic and manually activated open-and-close hinge device comprising:

a shaft member having axially spaced first and second sections;

a fixture securely attached to the first section of the shaft member, and including an actuating member with a push-button movable toward the second section of the shaft member when triggered;

an initiating cam assembled around the first section of the shaft member, said initiating cam being either rotatable or stationary relative to the shaft selectively, a locking device selectively applied upon said initiating cam to selectively engage said initiating cam in a locked state with no rotation permitted or in a free state with freedom to rotate;

a follower assembled axially inside of said initiating cam, said follower being rotatable and slidable relative to the shaft, first complementary interengagement structures formed on said initiating cam and said follower and configured to either have said follower bring said initiating cam to rotate commonly when said initiating cam is in the free state, or have said follower rotate relative to the initiating cam when said initiating cam is in the locked state;

a slider cam assembled around the second section and cooperating with said initiating cam to sandwich said follower therebetween axially, said slider cam being slidable axially, second complementary interengagement structures formed on said slider cam and said follower and configured to have said follower rotated when a relative axial movement between said slider cam and said follower occurs; and a primary spring member performing an axial deformation to constantly urge said slider cam in a first axial direction, and a secondary spring member performing the axial deformation to constantly urge the initiating cam in a second axial direction opposite to the first axial direction.

18. The automatic and manually activated open-and-close hinge device as claimed in claim 17, wherein said primary spring member is axially spaced from the second spring member.

19. The automatic and manually activated open-and-close hinge device as claimed in claim 17, wherein said slider cam is rotatable relative to the shaft member during operation.

20. The automatic and manually activated open-and-close hinge device as claimed in claim 17, said wherein an exerted force from said primary spring member is able to make the follower rotate along with the initiating cam when said initiating cam is in a free state, while unable to rotate said follower relative to the initiating cam when said initiating cam is in a locked position.

* * * * *